2,837,574

CHLORINATION OF ALCOHOLS

Harry E. Hill, Lewiston, and Guenter K. Weisse, Niagara Falls, N. Y., assignors to Olin Mathieson Chemical Corporation, a corporation of Virginia No Drawing. Application March 15, 1956
Serial No. 571,598

12 Claims. (Cl. 260—615)

Our invention relates to an improved method for the chlorination of alcohols in order to replace the hydroxyl groups present therein with chlorine. Our invention is particularly concerned with the chlorination of alcohols of the formula: $R'O(RO)_nROH$, wherein $R'$ is hydrogen or an alkyl radical containing from 1 to 4 carbon atoms, R is an alkylene radical containing from 2 to 3 carbon atoms and $n$ is an integer from 0 to 5, in order to produce the corresponding compounds wherein the hydroxyl groups are replaced by chlorine atoms.

Prior to our invention such chlorinations have been accomplished in various less advantageous ways, the most recent being the use of the expensive thionyl chloride as the chlorinating agent.

It is an object of our invention to provide a novel, practical, and economical method for the production of the above described chlorides in good yields. Another object is to effect the chlorination with the readily available surfur chlorides. Still a further object is to increase the yields over those of the prior art by the use of suitable catalysts. These and other objects will be apparent from the following description.

According to our invention the alcohols described above are treated with sulfur mono- or di-chloride in the presence of catalytic amounts of compounds containing a basic nitrogen atom. Among such compounds are, for example, pyridine; lower alkylated pyridines, such as, alpha picoline, beta picoline, gamma picoline, 2,3-lutidine, 2,4-lutidine, 2,5-lutidine; and the monoethyl pyridines; quinoline; isoquinoline; aniline and lower N-alkyl anilines such as dimethyl aniline and diethyl aniline; alpha naphthylamine; beta naphthylamine; ethylene diamine; triethylene tetramine; and so forth. The addition salts of such compounds with strong inorganic acids such as the hydrohalides and the hydrogen sulfates are also suitable. Ammonium chloride also acts as a catalyst, but we consider the use of other compounds such as pyridine to be preferable.

Sulfur monochloride has been previously used to accomplish the above-mentioned chlorination. This is disclosed in Organic Preparations by Weygand (Interscience, 1945) on page 99, where trimethylene glycol is shown to be converted to 1-chloro-3-hydroxypropane in 60 percent yield. The replacement of the second hydroxyl group is more difficult, however, and we have found that such dichloro compounds are obtainable only in 30–40 percent yield in the absence of a catalyst. As a result of our attempts to improve the yields of the reaction between sulfur chlorides and the alcohols, we have discovered that yields of over 70 percent of dichloro products can be realized if the reaction is completed in the presence of at least one of the above-mentioned compounds.

In general, the method employed in carrying out our invention involves premixing sulfur mono- or di-chloride with the alcohol, adding the catalyst, heating the mixture at a temperature of 100 C. to 200° C. for one to five hours, and separating the product by any suitable means. Where the alcohol employed as a starting material is a monohydric alcohol, we prefer that the molar ratio of the sulfur chloride, i. e. sulfur monochloride or sulfur dichloride, to alcohol employed be within the range from 1:1 to 1.2:1. Where the alcohol employed as a starting material is a dihydric alcohol, we prefer that the molar ratio of the sulfur chloride, i. e. sulfur monochloride or sulfur dichloride, to alcohol employed be within the range from 2:1 to 2.4:1. Although the reactants can be premixed in any order, we have found it preferable to slowly add the sulfur chloride to the alcohol while maintaining the temperature of the mixture below about 60° C. by external cooling.

Upon completion of the mixing the catalyst is added, preferably to the extent of from 0.1 to 1 percent by weight of the total reactants, although up to 2 percent is at times advantageous. The use of more than about 2 percent substantially does not increase the yield, and becomes uneconomical. The catalysts can be added either as free bases, or as the addition salts of strong inorganic or mineral acids. Although it is thought that the salt is the actual catalyst, there is no particular advantage in using it, since the hydrogen chloride by-product quickly forms such a salt with the free base if the latter is used.

When the reaction is complete the product can be efficiently recovered by vacuum distillation followed by fractionation. Further purification can be accomplished by treating the product with active carbon.

The following examples clearly illustrate a method of putting this invention into practice while placing no limitations thereon.

Example I

The reactor consisted of a 3-necked flask equipped with stirrer, dropping funnel, off-set thermowell and reflux condenser. Approximately 900 grams of triethylene glycol was placed in the reactor and 1300 grams of sulfur dichloride was added thereto dropwise. An ice bath was used to maintain the desired reaction temperature during the addition. The addition required 64 minutes to complete during which time the temperature was maintained at 44 to 55° C. At the end of this time 22 grams of pyridine, or about 1 percent by weight, was added to the reaction mixture. The ice bath was then removed, and the temperature was raised to between 140 and 145° C. and maintained there for one hour. The product was separated from the reaction mixture by takeover distillation at a pressure of 4–7 mm. of Hg and then isolated by fractionation through a 30 inch glass helice packed column. It boiled at 124° C./17 mm. Hg. The 883 grams of product so recovered was treated with 1 percent of Nuchar C–190-N (proprietary active carbon) for one hour at 100° C. In this way there was recovered 852 grams or 76 percent of the theory of purified 1,2 bis(beta-chloroethoxy) ethane.

$$n_D{}^{25} = 1.4592$$

Using the same apparatus, 300 grams of triethylene glycol was added dropwise to 433 grams of sulfur dichloride. The addition took 51 minutes at which time the flask temperature was maintained below 18° C. by means of an ice bath. When the addition was complete, the ice bath was removed and the temperature was raised to 140° C. and maintained there for 3 hours. This experiment was run with no catalyst and upon isolation of the product by distillation the yield was 135 grams or 36 percent of the theory of 1,2-bis(beta-chloroethoxy) ethane.

Example II

Again using the apparatus as described in Example I, 209 grams of sulfur dichloride was added to 240 grams of 2-methoxy-2'-hydroxydiethyl ether. The addition required 55 minutes during which time the temperature was maintained at 13–23° C. The ice bath in which the reaction flask had been immersed was then removed. About 4.5 grams or 1 percent by weight of pyridine was added to the reaction flask and the temperature thereof was raised to and maintained at 140° C. for 1 hour and 20 minutes. At the end of this time the reaction mixture was distilled to recover 2-methoxy-2'-chlorodiethyl ether. The latter was then subjected to fractional distillation through a 30 inch, glass-helice packed column with triethylene glycol dimethyl ether as chaser. In this way 188 grams of 2-methoxy-2'-chlorodiethyl ether, or 68 percent of the theoretical yield, was recovered, boiling point 165–167° C./747 mm., $n_D^{25}=1.4285$.

*Example III*

570 grams of sulfur monochloride was placed in an apparatus described in Example I. To this there was added 300 grams of triethylene glycol over a period of 10 minutes, the temperature increasing from 28° C. to 64° C. At the end of this time, 8.7 grams of aniline hydrochloride was placed in the reaction flask and its temperature was raised to 180° C. and maintained there for one hour and 15 minutes. Upon distillation, there was recovered 247 grams of 1,2-bis(beta-chloroethoxy) ethane, or 65 percent of the theory.

*Example IV*

The procedure of Example III was followed for four other catalysts. The catalyst and the yield obtained therewith are listed below:

| Catalyst | Wt. percent catalyst based on weight of sulfur dichloride and triethylene glycol | Yield, Percent |
| --- | --- | --- |
| Ammonium chloride | 1 | 54 |
| Dimethyl aniline | 1 | 52 |
| Urea | 1 | 49 |
| Diethylene triamine 3HCl | 2 | 46 |

Our invention is generally applicable for the replacement by chlorine atoms of the hydroxyl groups present in compounds of the formula: $R'O(RO)_nROH$ wherein $R'$ is a hydrogen or an alkyl radical having from 1 to 4 carbon atoms, $n$ is an integer from 0 to 5 and R is an alkylene radical having from 2 to 3 carbon atoms. Hence, in place of the triethylene glycol and 2-methoxy-2'-hydroxy diethyl ether utilized in the examples, there can be substituted monoethylene glycol, diethylene glycol, triethylene glycol, tetraethylene glycol, pentaethylene glycol, hexaethylene glycol, propylene glycol, dipropylene glycol, the monomethyl ether of monoethylene glycol, the monoethylether of monoethylene glycol, the mono-n-butyl ether of monoethylene glycol, the monomethyl ether of diethylene glycol, the monobutyl ether of diethylene glycol, the monoethyl ether of triethylene glycol, the monomethyl ether of monopropylene glycol, the monoethyl ether of monopropylene glycol, the mono-n-butyl ether of monoethylene glycol, the monomethyl ether of dipropylene glycol, the monoethyl ether of dipropylene glycol, the mono-n-butyl ether of dipropylene glycol and the like.

We claim:

1. A method for the replacement of the hydroxyl radicals of compounds of the formula $R'O(RO)_nROH$ with chlorine which comprises reacting a compound of the formula $R'O(RO)_nROH$ with a compound selected from the group consisting of sulfur mono-chloride and sulfur dichloride while the reactants are in admixture with a catalytic amount of a material containing a basic nitrogen atom, $R'$ being selected from the group consisting of hydrogen and alkyl radicals containing from 1 to 4 carbon atoms, R being an alkylene radical containing from 2 to 3 carbon atoms and $n$ being an integer from 0 to 5.

2. The method of claim 1 wherein said compound is triethylene glycol.

3. The method of claim 1 wherein said compound is 2-methoxy-2'-hydroxy diethyl ether.

4. The method of claim 1 wherein said sulfur chloride is sulfur monochloride.

5. The method of claim 1 wherein said sulfur chloride is sulfur dichloride.

6. The method of claim 1 wherein said material is pyridine.

7. The method of claim 1 wherein said material is aniline hydrochloride.

8. The method of claim 1 wherein said compound is triethylene glycol, wherein said sulfur chloride is sulfur dichloride and wherein said material is pyridine.

9. The method of claim 1 wherein said compound is 2-methoxy-2'-hydroxy diethyl ether, wherein said sulfur chloride is sulfur dichloride and wherein said material is pyridine.

10. The method of claim 1 wherein said compound is triethylene glycol, wherein said sulfur chloride is sulfur monochloride and wherein said material is aniline hydrochloride.

11. The method of claim 1 wherein said compound is tetraethylene glycol.

12. A method for the replacement of the hydroxyl radicals of compounds of the formula $HO(RO)_nROH$ with chlorine which comprises reacting a compound of the formula $HO(RO)_nROH$ with a compound selected from the group consisting of sulfur mono-chloride and sulfur dichloride while the reactants are in admixture with a catalytic amount of a material containing a basic nitrogen atom, R being an alkylene radical containing from 2 to 3 carbon atoms and $n$ being an integer from 0 to 5.

References Cited in the file of this patent

Derick et al.: J. Am. Chem. Soc., vol. 38 (1916), page 2481.

Ephraim: Inorganic Chemistry, 4th ed. (1947), pages 595, 601.

Ahmad et al.: J. Am. Chem. Soc., vol. 70 (1948), pages 3391, 3392.

Wagner et al.: Synthetic Organic Chem. (1953), page 92.